(12) United States Patent
Cohen et al.

(10) Patent No.: US 6,324,543 B1
(45) Date of Patent: *Nov. 27, 2001

(54) DYNAMIC OBJECT MIGRATION METHOD USING PROXY OBJECT LINKS TO SUPPORT AUTOMATIC OBJECT DISTRIBUTION IN AN OBJECT-ORIENTED ENVIRONMENT

(75) Inventors: Geoffrey Alexander Cohen, Durham; David Louis Kaminsky, Chapel Hill; Richard Adam King, Cary, all of NC (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/036,270

(22) Filed: Mar. 6, 1998

(51) Int. Cl.[7] ............................ G06F 12/00; G06F 15/173
(52) U.S. Cl. .......................... 707/200; 707/8; 711/124; 709/226
(58) Field of Search ........................ 709/201, 202, 709/203, 212, 217, 218, 221, 222, 230, 226; 707/200, 8; 711/100, 124

(56) References Cited

U.S. PATENT DOCUMENTS

| 5,613,148 | * | 3/1997 | Bezvinger et al. | 709/203 |
| 5,644,766 | * | 7/1997 | Coy et al. | 707/204 |
| 5,862,325 | * | 1/1999 | Reed et al. | 709/209 |
| 5,881,230 | * | 3/1999 | Christensen et al. | 709/203 |
| 5,903,725 | * | 5/1999 | Colyer | 707/103 |

OTHER PUBLICATIONS

Ref A: Newton's Telecom Dictionary, Newton, H., Flatiron Publishing, 14th Expanded and Updated Ed., Mar., 1998, see object.*

Ref B: Computer Dictionary, Redmond, WA, Microsoft Press, 3erd Ed., and Sep. 1997, see object.*

"Sumatra: A Language for Resource–aware Mobile Programs", A. Acharya, et al, Lecture Notes on Computer Science, No. 1222, pp. 111–130, 1997–4.

* cited by examiner

*Primary Examiner*—Le Hien Luu
*Assistant Examiner*—Beatriz Prieto
(74) *Attorney, Agent, or Firm*—Jeanine S. Ray-Yarletts; Marcia L. Doubet

(57) ABSTRACT

A method and system are described which allow programs to become dynamically reconfigurable without programmer intervention. This means that the programs can be dynamically distributed among multiple computers within a computer network without modification to the source code of the programs running on the system. In addition, the method and system described allow an administrator of the system to specify conditions under which reconfiguration is to occur without modification to the source text of the program to be dynamically reconfigured.

9 Claims, 9 Drawing Sheets

FIG. 6

```
do forever {
check for object registration
check computer resource usage
compare usages to predicates
if a predicate is satisfied {
check list of registered objects, initiating migration for
those whose predicate was satisfied
}
}
```

DYNAMIC OBJECT MIGRATION METHOD USING PROXY OBJECT LINKS TO SUPPORT AUTOMATIC OBJECT DISTRIBUTION IN AN OBJECT-ORIENTED ENVIRONMENT

BACKGROUND OF THE INVENTION

It has long been known that the ability to move objects dynamically from computer to computer is useful. For example, moving objects allows the system to load balance among computers. In addition, it allows the system to dynamically cluster objects that communicate frequently, reducing network traffic and improving overall system performance.

However, current systems that allow objects to be relocated (migrated) suffer significant drawbacks, typically requiring either a special purpose programming language (or special purpose modifications to a general purpose language) or a special purpose operating system. In the former case, the programmer must develop new skills and adorn their code with additional syntax to exploit object migration. In the latter case, the resulting programs are limited to execution on sparsely deployed systems.

The present invention, relating to Dynamic Object Distribution (DOD), describes a system that suffers neither of these limitations. In the preferred embodiment, the programmer simply writes his program in the Java programming language (Java is a trademark of Sun Microsystems Inc.) without adding any special syntax or notations. The program then executes on standard Java Virtual Machines (JVMs) which are widely deployed in the industry.

Object migration has been studied extensively in academia as well as in industry. Systems such as the v-kernel enable page-based migration on systems running the v-kernel, however, systems without the v-kernel cannot perform migration. Because the v-kernel requires operating system modification, it is not widely used. Systems such as Amber from the University of Washington migrate objects among nodes of a multi-processor computer. However, Amber requires the program to be written in a special language. The Amber runtime is also not widely used. A major benefit of the present invention is that it requires no kernel modifications and works in Java which is a widely-deployed language.

RELATED APPLICATIONS

Application Ser. No. 08/852,263 entitled Technique for Programmatically Creating Distributed Object Programs filed on May 7, 1997 and assigned to the assignee of the present invention.

U.S. Pat. No. 6,072,953 entitled Apparatus and Method for Dynamically Modifying Class Files During Loading for Execution filed on Sep. 30, 1997 and assigned to the assignee of the present invention.

SUMMARY OF THE INVENTION

Dynamic Object Distribution (DOD), as defined by the present invention, takes as input:

The set of Java class files comprising a software application. Each class file contains Java bytecodes (Java is a registered trademark of Sun Microsystems, Inc.).

A list of objects that the programmer chooses to enable for migration. By default, DOD assumes that all objects are migratable.

A list of the conditions ("predicates") under which DOD is to migrate the objects.

From the bytecode files, the DOD system generates local and remote "proxies" for the object. The proxies intercept method calls to and from the object, and route the calls to the object. When the object is local (it has not been migrated), the local proxy routes calls directly to the object; when the object is remote (it has been migrated), the local proxy routes calls to the remote proxy, which routes the calls to the object. A bytecode modification tool adjusts the names of the objects and references to the objects to ensure that name collisions do not occur between objects and their proxies.

As background, FIG. 1A illustrates calls from a method on an standard Java object to another standard Java object, in the illustration, calls from A 101 to B 105. FIGS. 1B and 1C show a typical scenario of calls before and after an object has been migrated. FIG. 1B shows calls being indirected through a local proxy 103 to the local object 105. FIG. 1C shows calls being sent from the local proxy 103 to a remote proxy 104, then to the object itself 106 residing on the remote machine.

Based on the user-specified conditions (or "predicatese", as described above), a "migration thread" determines when an object should be migrated. It monitors the resources on the computer to determine when a predicate is satisfied. (Optionally, the migration thread can also gather information about remote computers. For example, it could gather such information using the standard Unix command 'ruptime,' which returns information about the processor load of remote computers. Such information can be used for migration decisions.) To migrate the object, the migration thread instructs the local proxy to route method calls to the remote proxy, and to send a serialized version of the object and its remote proxy to the remote computer. At the remote computer, both objects are unserialized. Serialization is illustrated in FIG. 7 and described further in *Java in a Nutshell*, second edition, O'Reilly, May 1997, pp. 172–177. It is the flattening of an object so that it may be transmitted more efficiently through a network. An unserializer then reconstructs the original object at its destination.

OBJECTS OF THE INVENTION

It is an object of the present invention to provide a method for allowing programs to become dynamically reconfigurable without programmer intervention.

It is a further object of the present invention to allow a system to become dynamically reconfigurable without modification to the source text of the programs running on the system.

It is a further object of this invention to allow the administrator to specify conditions under which reconfiguration is to occur without modification to the source text of the program to be dynamically reconfigured.

It is a further object of this invention to allow the programmer to specify conditions under which the reconfiguration occurs on a per user basis.

It is a further object of this invention to reconfigure the system dynamically and automatically without programmer intervention at the time of distribution.

BRIEF DESCRIPTION OF THE DRAWINGS

FIG. 6 exemplifies a migration thread.

DETAILED DESCRIPTION OF THE PREFERRED EMBODIMENT

Figure 1A:
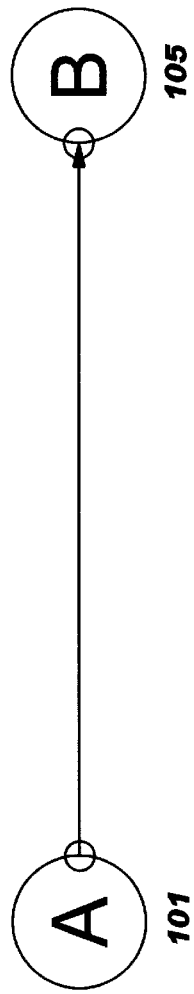
FIG. 1*a* illustrates calls between methods (prior art).
Figure 1B:
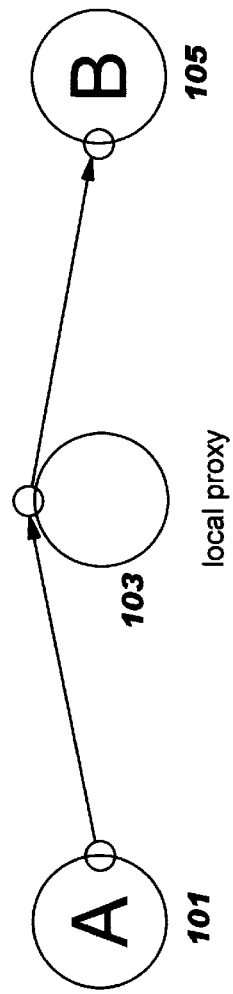
FIG. 1*b* illustrates calls between methods in objects prior to migration (prior art).
Figure 1C:
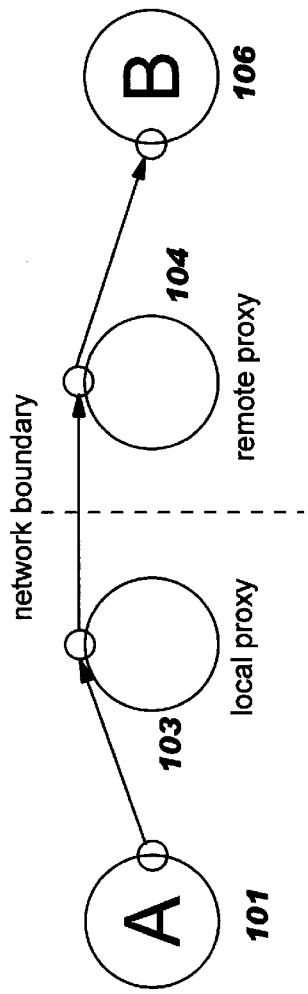
FIG. 1*c* illustrates calls between methods after migration (prior art).

The present invention (DOD) uses a proxy scheme similar to Automatic Object Distribution (AOD, described in application Ser. No. 08/852,263 referenced above), therefore, a brief review of AOD is presented herein. AOD allows a programmer or system administrator to determine at any time before a program begins executing, how the program should be distributed onto a client and a server computer. AOD then automatically creates the code that allows the application to run as a distributed application.

However, as described in the AOD invention referenced above, AOD does not permit objects to be migrated between client and server at run-time. It requires the distribution to be complete prior to execution. It would be beneficial to move objects during runtime to adjust to varying conditions such as server busier, more classes are moved to the client, reducing the server load. In the present invention an enhancement to AOD that allows objects to be moved during runtime is described.

First, the following example is used to review AOD. Consider an object 'a' instantiated from class A that contains (has a reference to) an object 'b' instantiated from class B. B has a method foo(). Exemplary pseudocode for this situation is:

```
class A {
    A () {
        // constructor for A
    }
    some_method (){
        B b = new B (); // allocate object b
        b.foo(); // call foo method on b
    }
}
class B {
    B () {
        // constructor for B
    }
    foo () { // foo performs some action
    }
}
```

If the programmer determined that 'a' was to be split from 'b', the AOD process would generate two proxies for B, B' and B". Calls from 'a' to 'b' would be intercepted by B', passed across the network to B" which then makes a local call to B, passing the results back as necessary. Note that once this configuration has been established, it cannot be altered at run-time.

Dynamic Object Distribution (DOD) is an enhancement to AOD. In DOD, the programmer identifies not only which classes should initially be on the client, and which should initially be on the server, but also which classes might be moved dynamically from one to the other. This identification as to which classes might be moved can be made any time up until the program is run. The programmer identifies these classes not by changing the program itself (this is known art, see below), but by (e.g.) typing the list into a separate file. Other methods of specification will be apparent to those skilled in the art. At run time, programmer-specified "predicates" are used to trigger the automatic migration of the, objects.

The DOD process is comprised of the following steps. These steps, as the preferred embodiment of the current invention, are expressed in the Java programming language and execution environment, although other embodiments in other object-oriented programming systems are possible.

1) Writing the classes comprising an application in the Java programming language.
2) Compiling the source Java files into Java bytecode files.
3) Identifying which objects are available to be moved.
4) Specifying predicates (conditions) under which an object might move.
5) Specifying initial execution locations for objects instantiated from each class in the system.
6) Generating the local and remote migration proxies (described below).

The user then starts the program. As the program executes, the DOD process automatically moves objects when the predicates of step 4 are satisfied.

In addition to each of these steps, DOD contains a "migration thread." This thread is responsible for monitoring system resources to determine when the predicates (described in step 4, and further described below) have been satisfied. It also initiates object migration.

This process is now described in further detail. Steps 1 and 2 are standard parts of the application development for Java. In prior implementations, after step 2, the application would be executed by a user. However, that application would lack the ability to move objects dynamically.

Next,(in Step 3) the classes that the developer desires to be "mobile" are identified. Objects instantiated from mobile classes are candidates for migration by DOD. If the programmer chooses not to enter any list, then DOD assumes that all objects can be migrated. Thus, by default, the programmer needn't make any source changes, nor need he do any additional work to enable object migration. This is a departure from known art. However, as we describe below, preparing an object for possible migration entails system overhead. The programmer can reduce this overhead by noting which objects will not be migrated. Still, requiring no changes to the program, even if a separate listing is required, provides significant benefit over the current art.

In step 4, the predicates are specified. These predicates are used to control the dynamic behavior of the system. The programmer identifies the conditions under which objects are migrated. For example, if objects designated O1 through O9 are to be executed on the server, the programmer can specify that DOD is to migrate O1 and O2 if the server load exceeds some threshold T1; O3, O4 and O5 are to be migrated if it exceeds T2; and O6 is to be migrated if it exceeds T3. O7, O8 and O9 are not migrated. In the preferred embodiment, this information is simply specified in a file called the "migration file," although other specification methods are clearly possible and would be obvious to one skilled in the art.

Note that migration files may be specified on a per user basis as well as on a more global basis. That is, in the preferred embodiment, each version of the migration file (alternatively, each section within a single migration file) is associated with one or more users of the application. Thus, the application can optionally exhibit different behavior when executed by different users.

Step 5 designates the initial configuration for the system. That is, the programmer tells the system which classes spawn server objects, and which spawn client objects. In the preferred embodiment, this information is also stored in the migration file.

An example of a migration file might be:

User1 MyClassOne CPU>0.5 # move if CPU over half utilized

User1 MyClassTwo CPU>0.7 # move if CPU over 70% utilized

User1 MyClassThree CPU>0.9 # move if CPU over 90% utilized

User1 MyIOClassOne Disk<0.4 # move if disk is 60% full

User1 MyIOClassTwo Disk<0.2 # move if disk is 80% full ('#' indicates the beginning of a comment; subsequent text on the line is ignored.)

Generating the local and remote proxies (in step 6)is one key to the DOD system. This is illustrated by example. Returning to a modified version of the example shown above, assume that objects 'a' and 'b' are co-resident, and the programmer identified objects instantiated from B as migration candidates. DOD reads the bytecode for class B (of which 'b' is an instance) and determines all of its public methods. As in AOD, DOD generates a proxy for B called B". All calls to B are then indirected through B". In the case of local calls, the call sequence is A→B"→B. In the case of remote calls, as in AOD, the sequence is A→B"→BΔ→B.

B"is then constructed to allow both local and remote calls. In exemplary pseudocode, B looks like:

```
class B {
    boolean local = TRUE; // object starts local
    B () { // constructor for the proxy for B
    create a reference to the real B
    }
    foo () {
    if (local) make local call to the local foo();
    else make remote call to foo as described in AOD
    }
}
```

As shown below, to each proxy, code must be added to migrate the object. In addition, code must be added that protects method calls against timing conflicts—that is, calls against methods in the object are not permitted while the object is migrating. This is done by making the proxy class "synchronized," (a standard Java term) thus protecting the class against race conditions, and adding a migration method. Finally, the local proxy must register itself with the migration thread. This allows the migration thread to locate the proxy when an object must be migrated.

Each proxy is constructed such that it implements the "Migratable" interface. This allows the migration thread's "register" method to accept a single type of object as a parameter, that is, a proxy class implementing the Migration interface. The migration thread's register method then stores references to the parameters (proxy objects) in a table for use when an object must be migrated.

Thus B" becomes:

```
synchronized class B implements Migratable {
    boolean local = TRUE; // object starts local
    B () { // constructor for the proxy for B
    create a reference to the real B
    register with the migration thread
    }
    migrate () {
        serialize the "real" b;
        send the serialized object via a socket to the partner where it
            will be instantiated
        local = FALSE;
    }
    foo () {
        if (local) make local call to the "real" foo();
        else make remote call to foo as described in AOD
    }
}
```

Note that since the proxy object B" is synchronized, by standard Java semantics, the migration method cannot be executed while another method in the object is being called; similarly, no method can be called while the object is being migrated.

Serialization of an object, and passing serialized objects over sockets is well-known art in Java. After the object is serialized and sent over the network (using a standard Java method called "writeObject"), it is received by a DOD component on the remote computer using another standard Java method ("readObject"). The unserialized object is now ready to execute on the remote computer.

Typically, to be serialized, classes must implement the Serializable interface provided in the standard Java release. However, instances of classes that do not implement the Serializable interface will not be serialized by the JVM. Yet, DOD requires that objects be migratable without source change, and Java requires that Serializable objects implement the Serializable interface.

Figure 4:
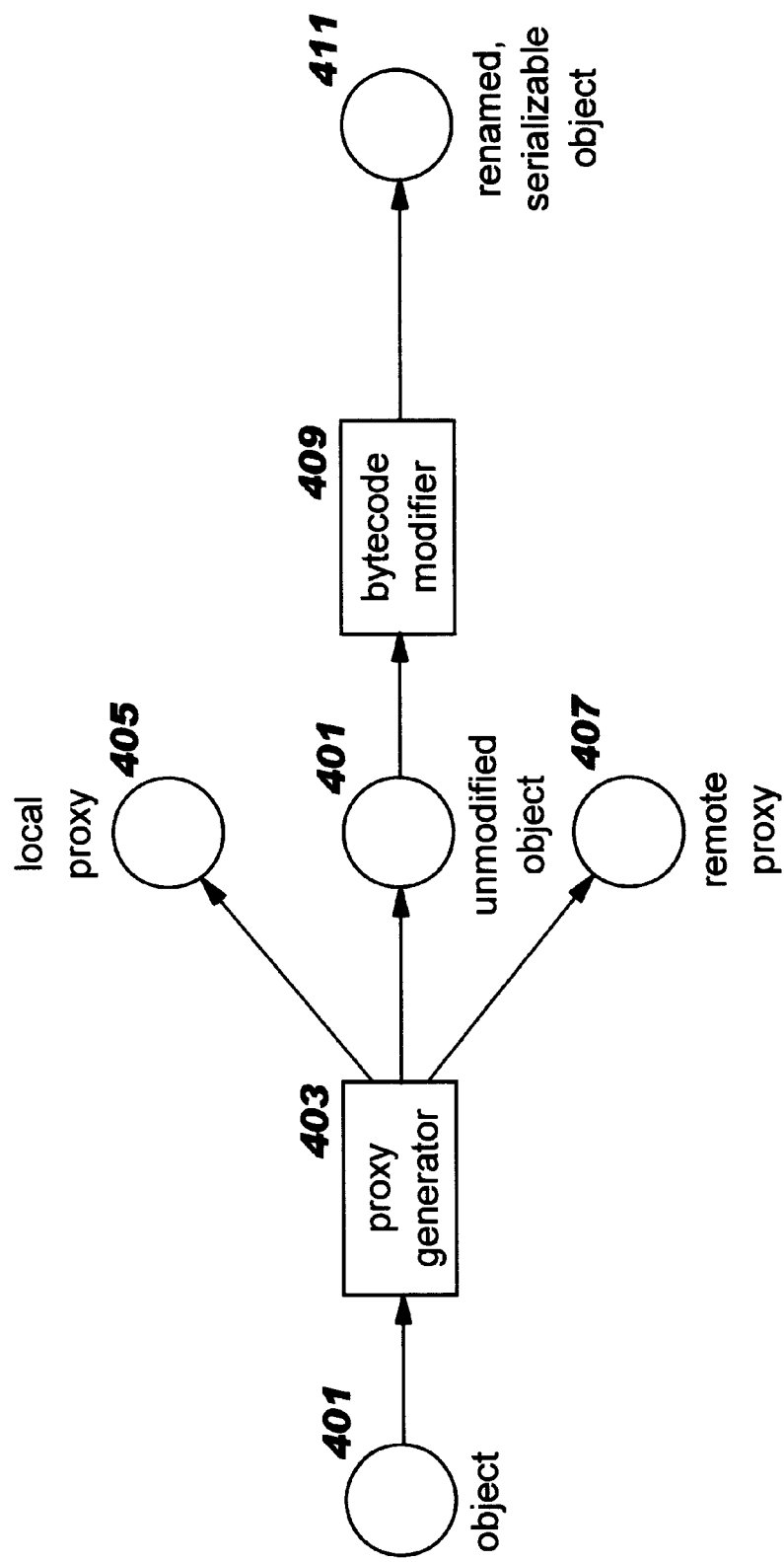
FIG. 4 illustrates proxy generation and bytecode modification.

This apparent problem is solved by identifying those classes that were listed by the user as mobile, but do not implement the Serializable interface. Using a known bytecode modification tool such as the JOIE (JAVA Object Instrumentation Environment) tool described in U.S. Pat. 6,072,953 entitled Apparatus and Method for Dynamically Modifying Class Files During Loading for Execution, a transformation is provided that, at the point when the class is first loaded by the JVM, marks the class as implementing the Serializable interface. At this point, the execution can proceed as usual. Note that since the change—forcing the class to implement the Serializable interface—is done automatically by a bytecode modification tool, the programmer is not required to do anything, and no change to the source code occurs. Using a similar mechanism, parameter objects can be made to implement the Serializable interface if they must be transmitted from a local to a remote proxy. FIG. 4 illustrates the process of proxy generation and bytecode modification.

In FIG. 4, an object 401 is processed by a proxy generator 403. The proxy generator creates a local proxy 405 and a remote proxy 407 as well as retaining the unmodified object 401. The bytecode modifier 409 then processes the unmodified object 401 to create a serializable object 411 from it.

As in AOD, the remote proxy (B" in the example) accepts calls from the local proxy, and makes local calls to the original object (B). In addition, the remote proxy must include code to redirect calls from the remote object, through the remote proxy, through the local proxy, and finally to the callee.

Figure 5:
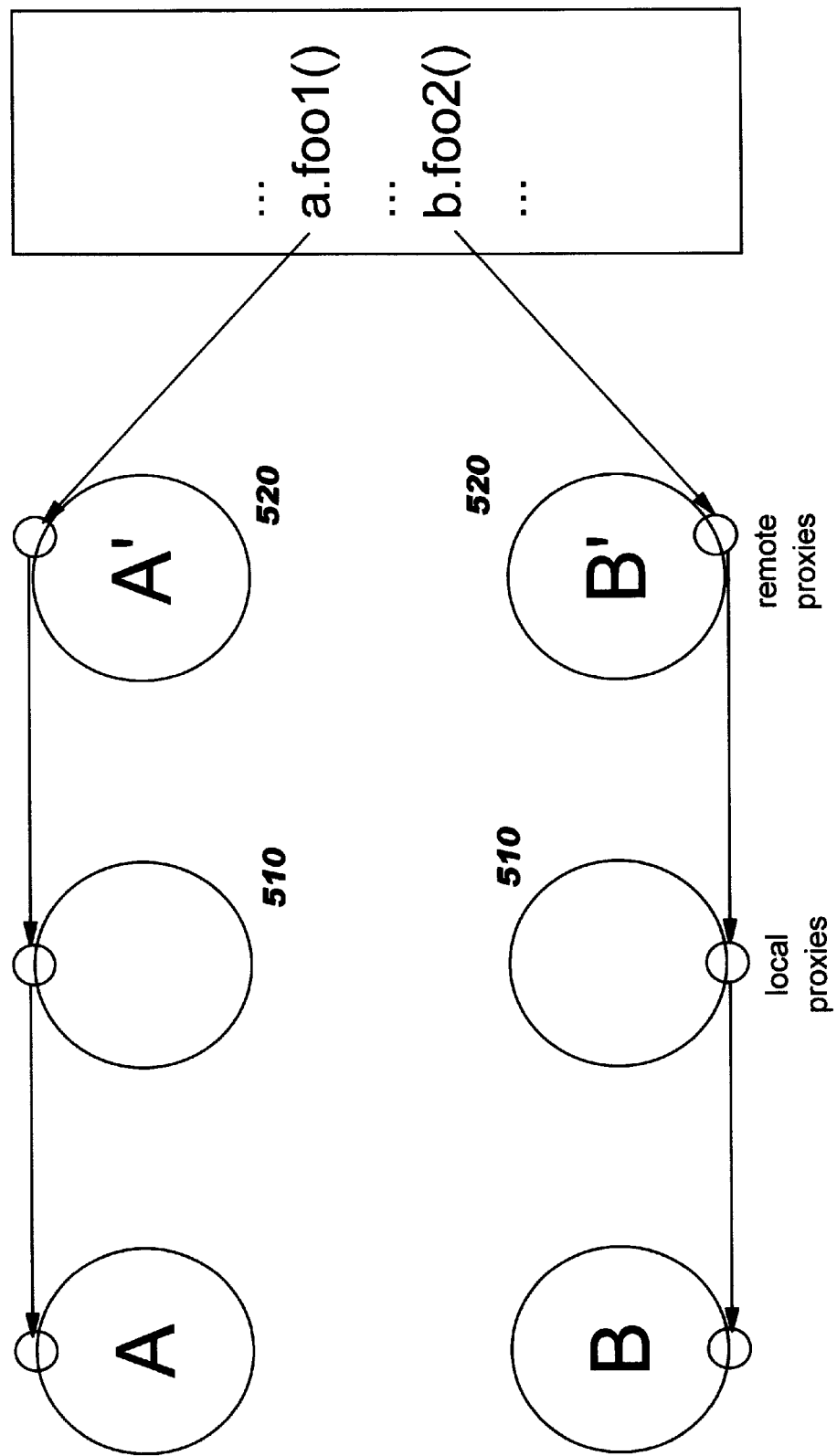
FIG. 5 illustrates call return preparation.
Figure 7:
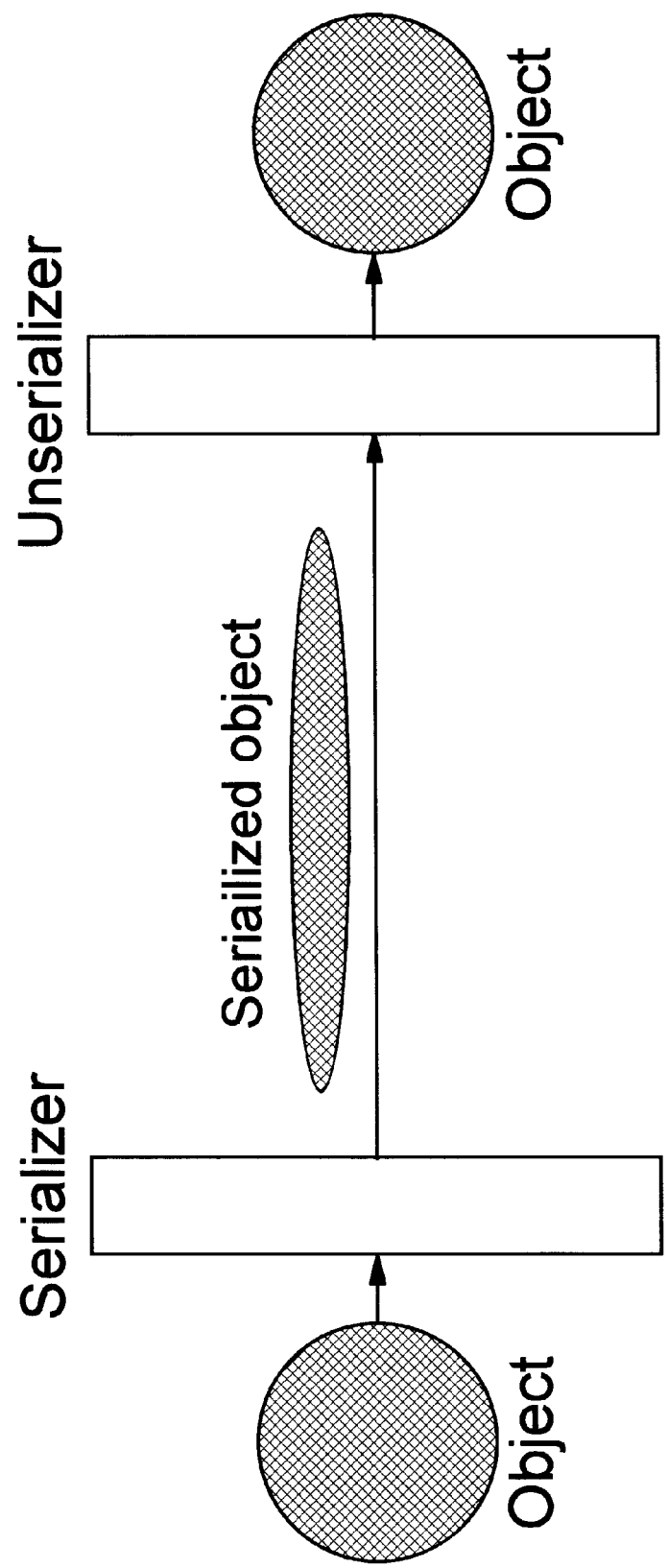
FIG. 7 depicts object serialization.

As illustrated in FIG. 5, the process of generating code for return calls is very similar to the process used in AOD and to the process used here for incoming calls. The bytecodes for the migratable object are inspected, and all method calls to other objects are extracted. For each such call, both a local proxy 510 and a remote proxy 520 are constructed containing similarly named methods to that discovered in the bytecodes. Code in the remote proxy ensures that when the method is called, a remote method in vocation (RMI) call to the local proxy is executed. Code in the local proxy ensures that when it receives a remote call, it makes a local call to the actual callee. Thus, this process is nearly identical to the process for generating proxies for incoming calls, except that the object is inspected for outgoing calls instead of for potential incoming calls (that is, public methods). Note that normal functions of the local and remote proxies are reversed in this case.

Migrating the object back to the local machine simply entails reversing the process. The process is initiated by the migration thread when it detects that an "unmigration" should occur. The migration thread calls the "unmigrate" method on the local proxy.

It is important to ensure that timing problems do not occur during unmigration. Because the local proxy is synchronized, the call to the unmigrate method will not execute (that is, it will block) until a time when it will be the only method executing in the local proxy. Since all calls to the remote callee must pass through the local proxy, we know that the remote callee will not be executing when the unmigration occurs. The unmigrate method on the local proxy simply calls the migrate method on the remote proxy. The call to the unmigrate method on the local proxy does not complete until the entire migration is complete.

The migrate method on the remote proxy performs the same function the migrate method on the local proxy performs. It serializes the object, transmits it to the local machine, which then unserializes the object. At that point, the local proxy sets its "local" boolean.

In the ongoing example, B' becomes:

```
synchronized class B {
    boolean local = TRUE; // object starts local
    B () { // constructor for the proxy for B
        create a reference to the real B
        register with the migration thread
    }
    unmigrate () {
        make a remote call to migrate on the remote proxy
        receive the serialized object
        unserialize the object
        local = TRUE;
        return;
    }
    migrate () {
        serialize the "real" b;
        send the serialized object via a socket to the partner where it
            will be instantiated
        local = FALSE;
    }
    foo () {
        if (local) make local call to the "real" foo();
        else make remote call to foo as described in AOD
    }
}
```

The user then simply starts the system as they would any client/server Java application.

As the application executes, DOD monitors the predicates specified in the migration file. When a predicate is satisfied (e.g., when a load threshold is satisfied), the migration process is triggered.

To perform the migration, when the migration thread of the DOD process detects that a predicate has been satisfied, the migration file is used to determine which objects are to be moved or migrated. They then call the migration method (shown above) on the proxies for each of these objects. The migration thread executes pseudocode illustrated in FIG. 6.

The migration method on the local proxy serializes the object, its proxies and the proxies of any objects which it calls and sends it to the remote node for execution. The JVM on the remote machine calls the "ReadObject" method to read the serialized objects, and registers the remote proxies with the Remote Method Invocation (RMI) Registry. Techniques for reading and writing serialized objects across a network via a TCP/IP socket and for interacting with the RMI Registry are well-known. In addition, the remote proxy (generated in step 6) for the migrated object is sent to the remote node.

The local proxy, as described above, is constructed such that it contains all of the public methods contained by the object which it is proxying. Each of these methods either calls a method on the actual object (if the actual object is local) or remotely calls (via RMI) a method on the remote object (if the object was migrated and is now remote).

To avoid changing the code for any object that calls the migratable object, the proxy takes the name of the object for which it is acting as a proxy. Thus, any calls originally destined for the migratable object will be retargeted at the proxy simply by the standard Java semantics.

However, Java does not permit two objects to have the same name. In the case where the object is executing locally, both the proxy and the object being proxied will have the same name. That is impermissible. To rectify the problem, a renaming process is executed.

Using a bytecode modification tool, the original (migratable object) is renamed by appending an arbitrary string to its name in its bytecode file. The constructors for the class are renamed similarly. The proxy then makes calls to this newly named object.

For example, consider the code fragment from above:

```
class A {
    A() {
        // constructor for A
    }
    some_method () {
        B b = new B (); // allocate object b
        b.foo(); // call foo method on b
    }
}
class B {
    B () {
        // constructor for B
    }
    foo() {
        // foo performs some action
    }
}
```
To create a proxy for B, first B is renamed in its bytecode ("class" file), then the proxy is created:
```
class Bwxyz { // this is the real, renamed B
    Bwxyz() {
        // constructor for the real class
    }
    foo() {
        // foo performs some action
    }
}
synchronized class B { // this is the proxy for B
    Bwxyz myBwxyz; // reference to the original object
    B () { // constructor for B
```

-continued

```
        myBwxyz = new Bwxyz (); // create a new object for the
        original B register with the migration thread
    }
foo () { // calls foo on the renamed version of the original B
        myBwxyz.foo(),
      }
      migrate () { // as above, object migration code, called by migr.thread
        serialize the "real" b;
        send the serialized object via a socket to the partner where it
            will be instantiated
        local = FALSE;
      }
      unmigrate () {
        make a remote call to migrate on the remote proxy
        receive the serialized object
        unserialize the object
        local = TRUE;
        return;
      }
}
```

The call from A to "B.foo" now refers to the "foo"0 method in the proxy object B. Thus, the B proxy has successfully intercepted calls to B. In turn, the B proxy makes calls through its reference to the original B.

Figure 2A:
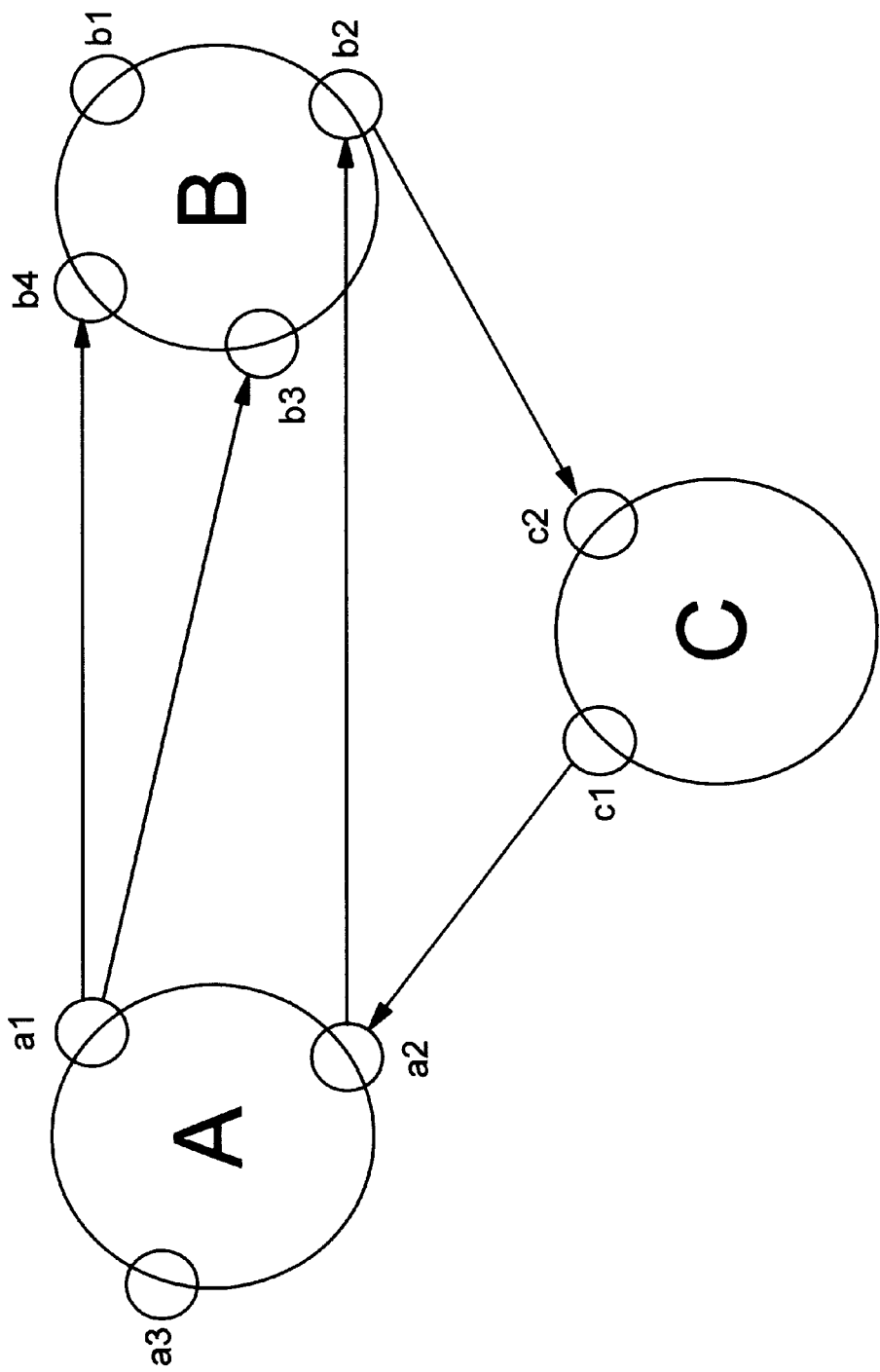
FIG. 2*a* depicts a standard object oriented (OO) program with three objects.

FIG. 2A shows a simple object oriented program comprised of 3 objects, A, B and C. migratable object A has three methods labeled a1–a3; B has four methods labeled b1–b4; and Object as CL, has two methods labeled c1 and c2. As indicated in the figure, the following method calls exist:

a1 calls b3 and b4 a2 calls b2 b2 calls c2 c1 calls a2

Figure 2B:
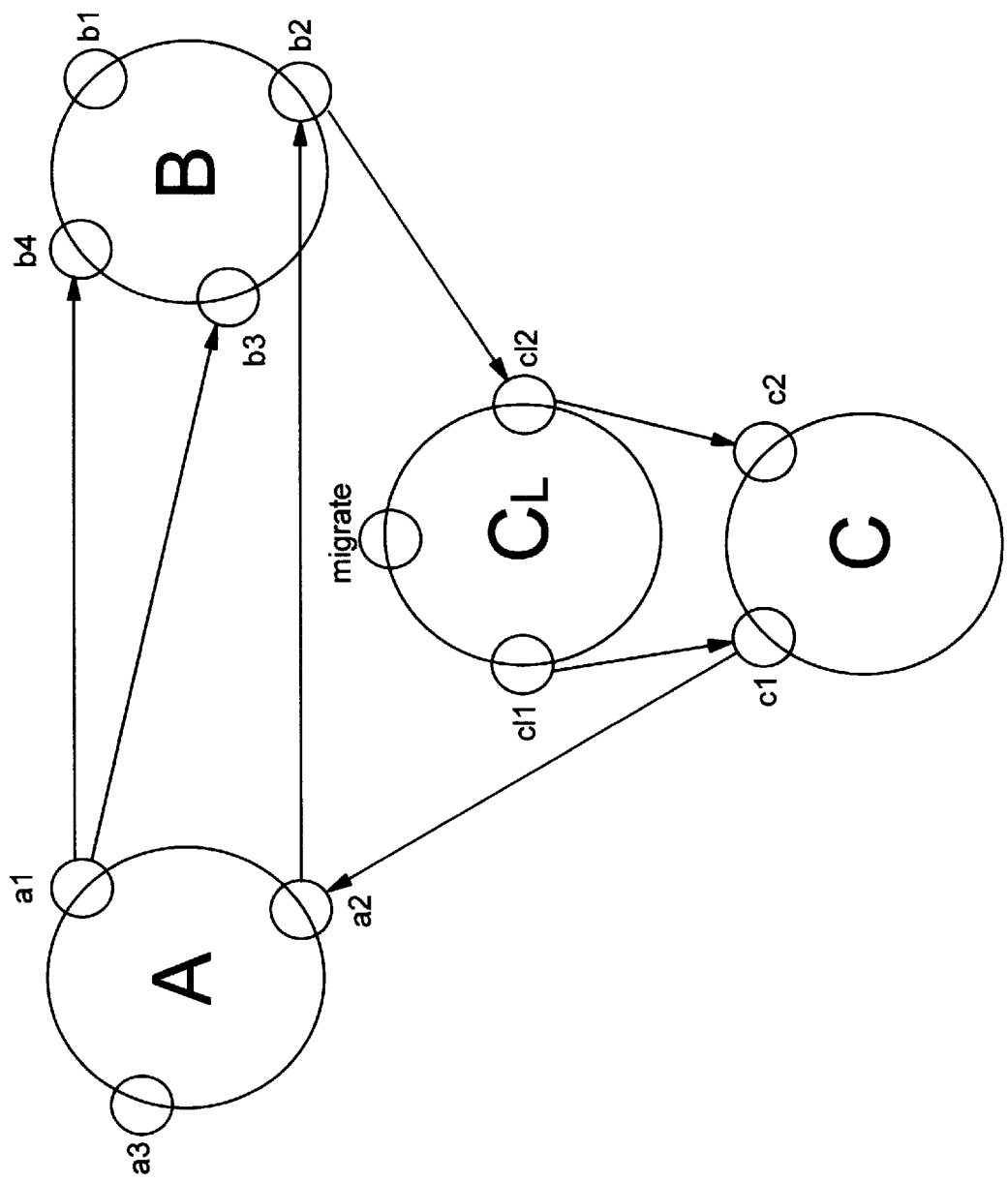
FIG. 2b depicts a local configuration with one relocatable object.

FIG. 2B depicts the same program after the programmer has specified that C is the only migratable object. The system automatically generated a local proxy specified in the figure as CL, containing two methods specified as cl1 and cl2. Note that, per the discussion of naming conflicts, the local proxy and its methods are named with the original names of the object and its methods; the original object C was renamed by the bytecode modification tool (object renaming is not illustrated in the figure).

The method call list is thus adjusted to:

a1 calls b3 and b4 a2 calls b2 b2 calls cl2 cl2 calls c2 cl1 calls c1 (unused)

c1 calls a2

Since this is a local configuration, calls from the caller (e.g., B) are intercepted by the local proxy (CL) and are directed to the callee (C) via a standard method call.

Figure 2C:
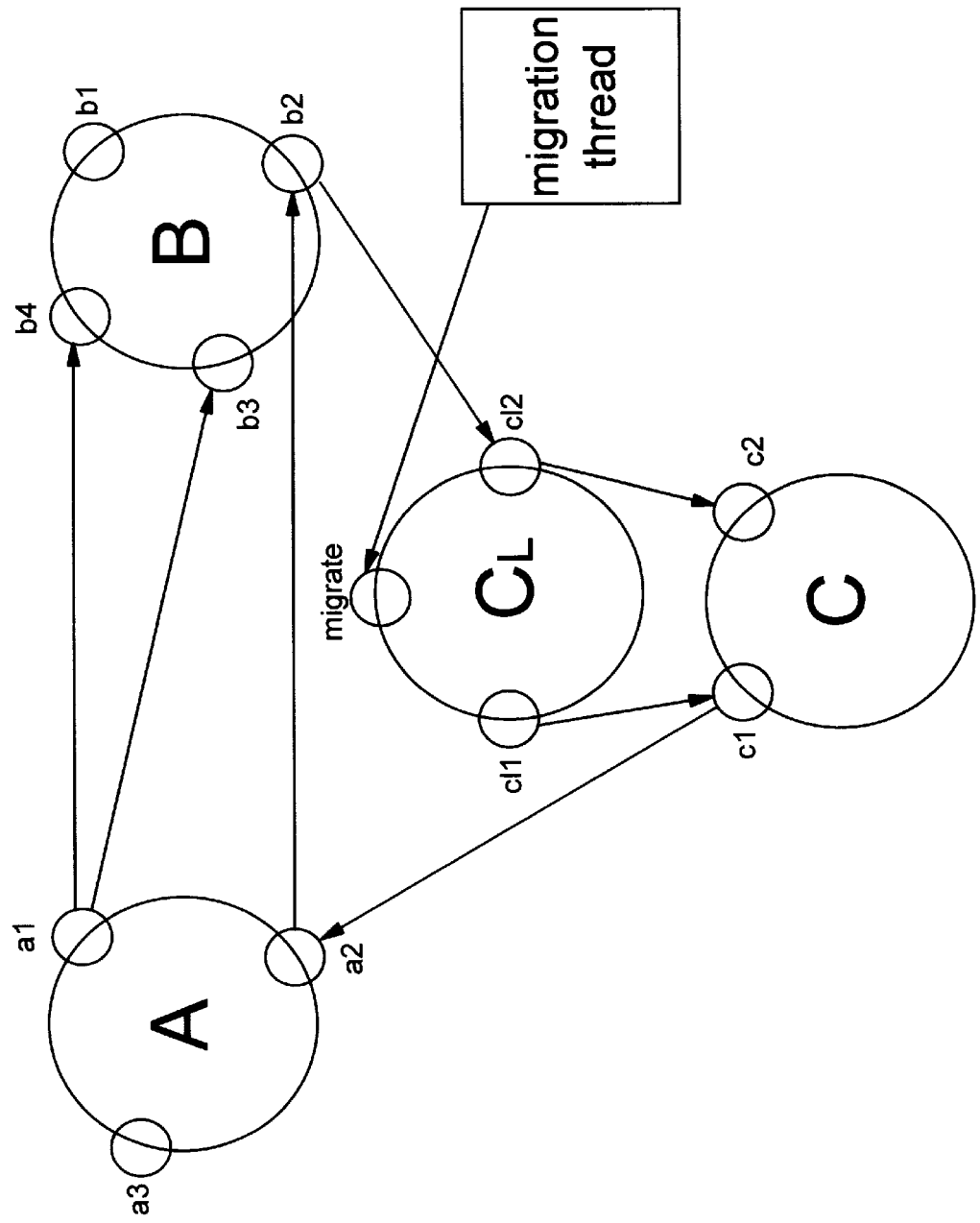
FIG. 2c depicts a migration thread for the configuration of FIG. 2b.

FIG. 2C shows the migration thread detecting a satisfied predicate and sending a message to the "migrate" method in the local proxy for C (CL). This causes the migration of C to the remote machine, and the transition to the configuration illustrated in FIG. 3.

Figure 3:
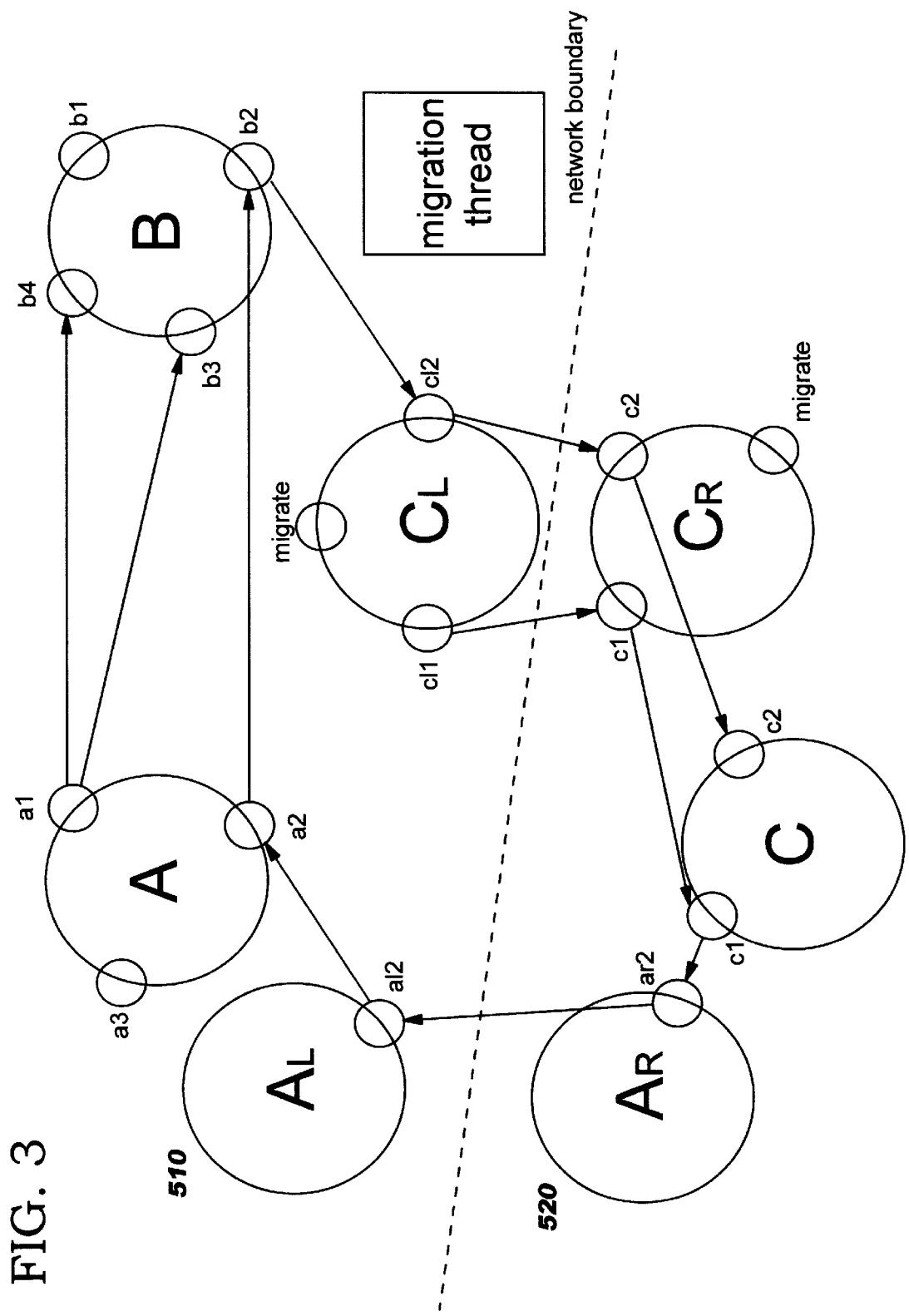
FIG. 3 demonstrates operation after method object C has been migrated to a remote host.

FIG. 3 shows the same configuration operating after C has been migrated to a remote computer. The method call list becomes:

a1 calls b3 and b4 a2 calls b2

II Call from b2 to c2 indirected remotely b2 calls cl2 cl2 calls cr2 using RMI cr2 calls c2

II Potential, but unused, calls into c1 cl1 calls cr1 using RMI (unused)

cr1 calls c1 (unused)

II Calls from c1 to a2 c1 calls ar2 ar2 calls al1 using RMI al2 calls a2

As described above, DOD consists of the following main steps: the programmer writes and compiles an application. The result is a set of Java bytecode (class) files. This is a standard development phase for Java applications, and is not strictly a part of the present invention. Next the programmer identifies which objects can migrate, and the conditions under which they are to migrate. Then DOD generates the local and remote stubs. DOD performs bytecode modification to ensure that the appropriate classes implement the Serializable interface and that all name conflicts are resolved. The stubs contain the code to direct method calls to the object whether it is local or remote. It also contains the code necessary to migrate the object. Next the migration thread monitors the system resources, and determines when a predicate is satisfied. When a predicate is satisfied, it calls the migrate method on the objects proxy, causing a migration. Next the migration method serializes the remote object, along with the required remote proxies, and transmits them to the remote JVM (Java virtual machine), where the objects are reinstantiated. The application can then be restarted with its new configuration.

As with the AOD invention referenced above, since this migration relies on breaks along method-call boundaries (which is standard convention and good programming practice), objects whose member variables are accessed directly cannot be migrated. To avoid difficulty, objects that are potentially migratable should contain only private member variables.

What is claimed is:

1. A method for dynamically distributing programmed objects of a computer program, each programmed object containing one or more programmed entities, from a first computer to one or more remote computers, said computer program having one or more programmed objects, said method comprising the steps of:

partitioning the programmed objects of the computer program into (1) a first subset which are migratable at run-time from an initial location on the first computer to one of the remote computers and (2) a remaining subset which are not migratable, wherein the first subset and the remaining subset together comprise all the programmed objects of the computer program;

creating a list of conditions under which each of the first subset of programmed objects are migratable;

programmatically identifying, for each programmed object in the first subset, each programmed entity within said programmed object that allows access from other objects;

programmatically generating a first proxy and a second proxy for each programmed object in the first subset and for each of the identified program entities, said first proxy residing on the first computer and said second proxy created on said first computer for transferring to one of the remote computers upon a migration of the programmed object, wherein said first proxy contains network linkage and indication to access said programmed object on said remote computer after the migration and said second proxy contains a programmatically generated entity to route the access from the first proxy to the programmed object on the remote computer; and dynamically migrating, at run-time, a selected programmed object that was executable on said first computer from said first computer to the remote computer when said selected object's corresponding condition from said list of conditions is met, without requiring intervention by a human.

2. The method as claimed in claim 1, further comprising the steps of:

programmatically generating new names for the programmed objects in the first subset; programmatically modifying the programmed objects in the first subset to use the generated new names; and progammatically modifying references to the programmed objects in the first subset such that the references use the generated new names.

3. The method as claimed in claims 1 or 2, wherein said dynamically migrating step further comprises the steps of:

moving a copy of said selected programmed object to said remote computer;

moving said second proxy for the selected programmed object to said remote computer; and directing said first proxy to call said second proxy on said remote computer.

4. Computer-readable code for dynamically distributing programmed objects of a computer program, each programmed object containing one or more programmed entities, from a first computer to one or more remote computers, the computer program having one or more programmed objects, the computer-readable code embodied on one or more computer-readable media and comprising:

a subprocess for partitioning the programmed objects of the computer program into (1) a first subset which are migratable at run-time from an initial location on the first computer to one of the remote computers and (2) a remaining subset which are not migratable, wherein the first subset and the remaining subset together comprise all the programmed objects of the computer program;

a subprocess for creating a list of conditions under which each of the first subset of programmed objects are migratable;

a subprocess for programmatically identifying, for each programmed object in the first subset, each programmed entity within the programmed object that be are accessible from other objects;

a subprocess for programmatically generating a first proxy and a second proxy for each programmed object in the first subset and for each of the identified program entities, the first proxy residing on the first computer and the second proxy created on the first computer for transferring to one of the remote computers upon a migration of the programmed object, wherein the first proxy contains network linkage and indication to access the programmed object on the remote computer after the migration and the second proxy contains a programmatically generated entity to route the access from the first proxy to the programmed object on the remote computer; and a subprocess for dynamically migrating, at run-time, a selected programmed object that was executable on the first computer from the first computer to the remote computer when the selected object's corresponding condition from the list of conditions is met, without requiring intervention by a human.

5. The computer-readable code as claimed in claim 4, further comprising:

a subprocess for programmatically generating new names for the programmed objects in the first subset;

a subprocess for programmatically modifying the programmed objects in the first subset to use the generated new names; and a subprocess for programmatically modifying references to the programmed objects in the first subset such that the references use the generated new names.

6. The computer-readable code as claimed in claims 4 or 5, wherein the subprocess for dynamically migrating further comprises:

a subprocess for moving a copy of the selected programmed object to the remote computer;

a subprocess for moving the second proxy for the selected programmed object to the remote computer; and a subprocess for directing the first proxy to call the second proxy on the remote computer.

7. A system contained within a computer network, the computer network having multiple computers connected together using telecommunications mechanisms, the system adapted for dynamically distributing programmed objects of a computer program from a first computer to one or more remote computers, wherein each programmed object contains one or more programmed entities and the computer program has one or more programmed objects, the system comprising:

means for partitioning the programmed objects of the computer program into (1) a first subset which are migratable at run-time from an initial location on the first computer to one of the remote computers and (2) a remaining subset which are not migratable, wherein the first subset and the remaining subset together comprise all the programmed objects of the computer program;

means for creating a list of conditions under which each of the first subset of programmed objects are migratable;

means for programmatically identifying, for each programmed object in the first subset, each programmed entity within the programmed object that are accessible from other objects;

means for programmatically generating a first proxy and a second proxy for each programmed object in the first subset and for each of the identified program entities, the first proxy residing on the first computer and the second proxy created on the first computer for transferring to one of the remote computers upon a migration of the programmed object, wherein the first proxy contains network linkage and indication to access the programmed object on the remote computer after the migration and the second proxy contains a programmatically generated entity to route the access from the first proxy to the programmed object on the remote computer; and means for dynamically migrating, at run-time, a selected programmed object that was executable on the first computer from the first computer to the remote computer when the selected object's corresponding condition from the list of conditions is met, without requiring intervention by a human.

8. The system as claimed in claim 7, further comprising:
means for programmatically generating new names for the programmed objects in the first subset;
means for programmatically modifying the programmed objects in the first subset to use the generated new names; and
means for programmatically modifying references to the programmed objects in the first subset such that the references use the generated new names.

9. The system as claimed in claims 7 or 8, wherein the means for dynamically migrating further comprises:
means for moving a copy of the selected programmed object to the remote computer;
means for moving the second proxy for the selected programmed object to the remote computer; and
means for directing the first proxy to call the second proxy on the remote computer.

* * * * *